United States Patent [19]

Peitz, Jr.

[11] Patent Number: 4,896,828

[45] Date of Patent: Jan. 30, 1990

[54] SOLID STATE EMERGENCY HEAT CIRCUIT

[75] Inventor: Robert W. Peitz, Jr., Fayetteville, N.Y.

[73] Assignee: Carrier Corporation, Syracuse, N.Y.

[21] Appl. No.: 370,780

[22] Filed: Jun. 23, 1989

[51] Int. Cl.⁴ .......................... G05D 23/00; G05B 9/02
[52] U.S. Cl. ...................................... 236/10; 236/94; 364/187
[58] Field of Search ................. 62/161, 163, 125, 126, 62/213; 236/10, 11, 94; 165/11.1, 29; 364/184, 185, 187

[56] References Cited

U.S. PATENT DOCUMENTS

| 4,421,268 | 12/1983 | Bassett et al. | 236/10 |
| 4,426,850 | 1/1984 | Reedy | 62/161 X |
| 4,723,703 | 2/1988 | Thompson | 236/11 |
| 4,729,207 | 3/1988 | Dempsey et al. | 126/112 |
| 4,807,588 | 2/1989 | Bentley et al. | 126/110 R |
| 4,831,511 | 5/1989 | Hanson | 364/184 |

Primary Examiner—Harry B. Tanner
Attorney, Agent, or Firm—Bernhard P. Molldrem, Jr.

[57] ABSTRACT

An emergency heat circuit for a microprocessor-controlled furnace has a first emergency heat switch with one terminal in contact with a rectifier circuit that provides a DC voltage when the thermostat calls for heat, and another terminal connected to an emergency heat-active input of the microprocessor. A first opto-isolator has an optical actuator, such as an LED connected to the microprocessor failure output and a switched element unless such as a photo-transistor, with terminals connected in parallel to the first emergency heat switch. A second opto-isolator is also connected to the emergency heat switch and has an AC photo-actuated switch element, such as a photo-triac, connected, for example, to the W conductor and with an output connected to the rectifier circuit. The photo-triac latches on until the thermostat is satisfied.

6 Claims, 1 Drawing Sheet

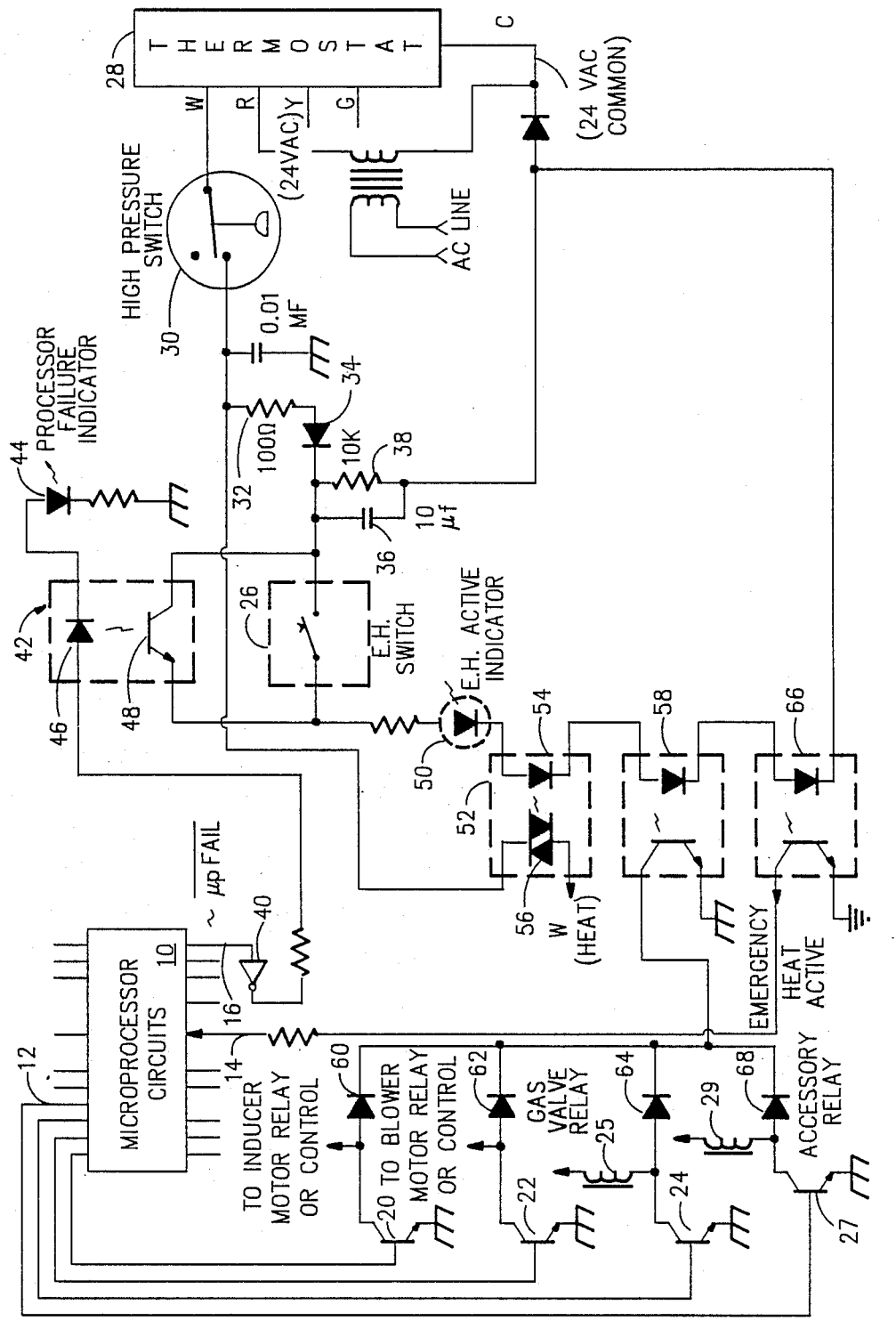

SOLID STATE EMERGENCY HEAT CIRCUIT

BACKGROUND OF THE INVENTION

This invention relates to furnace control apparatus and circuitry, and is more particularly concerned with an emergency heat circuit for a microprocessor controlled furnace to provide emergency control of furnace operations for heat in the event of a system failure, e.g., microprocessor failure.

Modern furnaces for the home or for many commercial applications operate at two or more burner rates and several blower speeds, and the operation of these can be sequenced by means of a microprocessor-based control. This is especially true for high-efficiency condenser furnaces of the type described, e.g., in the U.S. Pat. No. 4,729,207, granted Mar. 8, 1988. In these furnaces the level of air flow through or over its heat exchanger is closely controlled; consequently high and low pressure switches are monitored to control inducer and blower motor speed. Burner operation is also closely monitored. The microprocessor of the control circuit contains a suitable algorithm to control the furnace operation for optimum efficiency. However, in the event of microprocessor failure, the furnace should be able to operate at a single speed when the room thermostat calls for heat. Preferably, this should be automatic, without intervention by the home owner, who presumably is unskilled in the workings of the furnace control circuit.

The control circuit should also provide for emergency bypass operation in the event of failure of elements other than the microprocessor, for example, failure of low pressure or temperature sensors, etc.

An emergency heat bypass arrangement for a furnace has been proposed in U.S. Pat. No. 4,723,703. The circuit of that patent provides an alternate path through a relay subject to an emergency heat switch that controls its solenoid. However, its relay is subject itself to malfunction, and it was desired to replace the mechanical relay with opto-isolation or other solid-state switches. It was also desired to provide automatic emergency heat actuation in the event of microprocessor failure.

OBJECTS AND SUMMARY OF THE INVENTION

It is an object of this invention to provide an improved emergency heat circuit.

It is more specific object to provide an emergency heat circuit which will automatically operate a dual firing rate furnace at high heat in the event of microprocessor failure.

It is a further object of this invention to produce an automatic emergency heat circuit which avoids mechanical parts and operates with a reduced number of components.

According to an aspect of this invention, an automatic emergency heat circuit is provided in association with a microprocessor-controlled high-efficiency gas furnace. Logic inputs and outputs include an input to receive a thermostat indication, such as a call for heat, an emergency-heat-active input for inducing the microprocessor to carry out a suitable emergency heat algorithm; an output to control a gas valve to the furnace; an output to control a blower motor in the furnace; an output to control an induction fan motor in the furnace; and a microprocessor failure output which provides a particular level, e.g. "high" when the microprocessor is functioning properly and a complementary level, e.g. "low" when the microprocessor is malfunctioning only when there is a current in the associated LED.

A room thermostat is connected to the furnace via an R conductor to which 24 volt AC power is supplied, a C conductor serves as a common conductor for the thermostat power, and a W conductor supplies AC power from the R conductor when the thermostat detects a low ambient temperature. That is, 24 volts AC appears on the W conductor as a call for heat, and is switched off from the W conductor when the thermostat is satisfied.

The emergency heat circuit includes a rectifier circuit having an input connected, preferably through a high-pressure switch, to the W conductor and an output that provides a DC voltage whenever the AC voltage appears on the W conductor. A manually actuable emergency heat switch has a first terminal connected to the rectifier output and second terminal connected to a second opto-isolator. A first opto-isolator or optical switch device has an LED element connected to the microprocessor failure output and a switched element such as a photo-transistor connected in parallel to the emergency heat switch. Another optical switch device or opto-isolator has its actuator LED connected between the second terminal of the emergency heat switch and the common conductor, and has an AC photo-actuated element, e.g. a photodiac or phototriac that latches AC power to the emergency heat circuit from the W conductor.

A further opto-isolator has an LED in series with the second opto-islolator LED and a photo transistor switch for switching on the blower motor and burner when the furnace is in the emergency heat mode. Thus, in the event of microprocessor failure, the furnace will continue to furnish heat until the thermostat is satisfied, but only at the high burner and fan speeds.

A yet further opto-isolator has an LED in series with the above-mentioned opto-isolators and a photo transistor switch that provides emergency heat active indication EH to the microprocessor. This element provides indication if an only if current is flowing in the emergency heat circuit.

The above and many other objects features, and advantages of this invention will be more fully understood from the ensuing description of a preferred embodiment, which is to be considered in connection with the accompanying Drawing.

BRIEF DESCRIPTION OF THE DRAWINGS

The sole drawing Figure is a circuit schematic diagram of the emergency heat circuit according to one preferred embodiment of this invention.

DETAILED DESCRIPTION OF THE PREFERRED EMBODIMENT

With reference to the sole drawing Figure, a preferred embodiment of the invention is an emergency heat circuit that operates a dual-firing-rate furnace at high heat in the event of microprocessor control failure. In the furnace control circuitry, a microprocessor 10 has data outputs 12 for controlling inducer motor speed, blower motor speed, gas valve condition, and the like; a data input 14 for receiving a signal indicating whether the emergency heat circuit is active, and an output 16 which for example, provides a high or "one" level when the microprocessor 10 is functioning normally, and a low or "zero" when the microprocessor is malfunctioning.

Here the data outputs 12 are shown connected to emitter-follower transistors 20 and 22 to control an inducer motor relay and a blower motor relay, respectively, and to an emitter-follower transistor 24 which actuates a gas valve relay 25, and an emitter-follower transistor 27 which actuates an accessory relay 29.

A manually actuated emergency heat switch 26 has one terminal connected to the emergency heat input 14 of the microprocessor 10 through opto-isolators 52,58,66 to be described later.

A thermostat 28 is provided with 24 volts AC from the usual R conductor, and applies this to a thermostat W conductor to call for heat when the ambient temperature drops below a threshold level. The W conductor is coupled through a high pressure switch 30, which serves as a safety interlock. When the thermostat closes, a portion of the 24 volt AC power passes through a low value resistor 32 and a rectifying diode 34 to charge up a capacitor 36. This provides a DC power to the other terminal of the emergency heat switch 26. As shown here, a 10K resistor 38 is connected in parallel with the capacitor 36, and then is connected to the C conductor, which serves as a 24 volt AC common point.

The microprocessor failure output 16 is connected through an inverting amplifier 40 and an opto-isolator 42 to a processor failure indicator LED 44, which lights to show the microprocessor 10 has failed. The opto-isolator 42 consists of a light-emitting diode 46 and a photo-transistor 48 that has its power terminals connected in parallel with the manual emergency heat switch 26. The downstream electrode of this photo-transistor 48 is also coupled through a light-emitting diode 50 to opto-isolator 52, which consists of a light emitting diode 54 and a photo-triac 56. The latter is connected on the one side to the circuit formed of the resistor 32, diode 34 and capacitor 38, and on the other side to the thermostat to receive AC power from the W conductor when the thermostat 28 is closed.

The opto-isolator 52 is, in this embodiment, followed by another opto-isolator 58, which in turn is connected through one diode 60 to the inducer motor control or relay, through another diode 62 to the blower motor control or relay, through another diode 64 to the gas valve relay 25, and through yet another diode 68 to the accessory relay 29. One or more additional optoisolators 66 can be connected in series to indicate to the microprocessor that emergency heat is active. The last of these opto-isolators is connected to the 24 volt AC common conductor C.

The operation of this circuit is as follows. With the emergency heat switch 26 closed, when the thermostat 28 closes, the W conductor carries 24 volts AC to call for heat. This passes through common and normally-closed contact of the highpressure switch to charge up the capacitor 36 with DC. This supplies DC current through the opto-isolators 42, 52, and 58. The opto-isolator 52 latches the system on, and continues to supply the rectifier diode after the high-pressure switch actuates (i.e., opens the normally-closed contact). The optoisolator 58 assumes control from the microprocessor for energizing the inducer motor, the blower motor, the gas valve and the accessories. The existing furnace pilot interlocks and pressure interlocks (not shown) will control the proper sequence of burner operation. The microprocessor 10 is alerted to the emergency heat condition by the Emergency Heat Active signal supplied to the data input 14. When the thermostat is satisfied, the W conductor is de-energized, and the opto-isolator 52 delatches. This shuts the furnace off. A new call for heat will restart the cycle.

If the microprocessor circuits determine that there is a fault in the control, the emergency heat mode is activated automatically. A microprocessor fail signal at the output 16 energizes the opto-isolator 42, which bypasses the manual emergency heat switch 26. Also shown associated with the thermostat 28 are Y and G conductors, which are conventionally used to call for air conditioning and for fan, respectively.

While the invention has been described in detail with respect to a single preferred embodiment, it should be understood that the invention is not limited to that embodiment. Rather, many modifications and variations would present themselves to those skilled in the art without departing from the scope and spirit of this invention, as defined in the appended claims.

What is claimed is:

1. An emergency heat circuit for a microprocessor-controlled furnace of the type in which a microprocessor controller for the furnace has a plurality of logic inputs and outputs including an input to receive a thermostat indication, an emergency-heat-active thermostat indication, an emergency-heatactive input for inducing a suitable emergency heat algorithm, an output to control a gas valve to the furnace, an output to control at least one blower motor, and a microprocessor failure output which provides a particular level when the microprocessor is functioning properly and another complementary level when the microprocessor is malfunctioning; and which includes a thermostat having an R conductor to which AC thermostat power is applied, a C conductor which serves as a common conductor for said AC thermostat power, and a W conductor which supplies AC power from the R conductor when the thermostat senses a low ambient temperature condition; the emergency heat circuit comprising:

a rectifier circuit having an input connected to said W conductor and an output that provides a DC voltage when said AC voltage appears on said W conductor;

a manually actuable emergency heat switch having one terminal connected to the rectifier circuit output and another terminal connected to means responsive to the switch for actuating the emergency-heat-active input of the microprocessor;

first photo-optical switch means having an optical actuator connected to said microprocessor failure output and a switched element having terminals connected in parallel to the manually actuable emergency heat switch; and second optical switch means having an optical actuator connected between said emergency heat switch and said C conductor and a photo-optically switched element for switching on one or more of said gas valve and said one or more blower motors.

2. An emergency heat circuit according to claim 1 further comprising third photo-optical switch means having an optical actuator connected between said emergency heat switch and said C conductor, and a photo actuated latching switched element having one terminal connected to said rectifier circuit and another terminal connected to said W conductor to latch the emergency heat circuit on.

3. An emergency heat circuit according to claim 2 wherein said second and third photo-optical switch means have their optical actuators connected in series between the emergency heat switch and said C conductor.

4. An emergency heat circuit according to claim 1 further comprising a processor failure indicator LED in series with said first photo-optical switch means optical actuator.

5. An emergency heat circuit according to claim 1 further comprising a high pressure switch disposed in series between said W conductor and said rectifier circuit, providing a safely interlock which initiates furnace operation only when a heat exchanger pressure drop in said furnace remains below a predetermined threshold level before a heating cycle begins.

6. An emergency heat circuit according to claim 1 wherein said means responsive to said switch includes further photo-optical switch means having an optical actuator connected between said emergency heat switch and said C conductor, and a photo actuated switched element connected between a point of reference potential and the emergency-heat-active input of the microprocessor.

* * * * *